United States Patent [19]

Gähwiler

[11] Patent Number: 4,991,882
[45] Date of Patent: Feb. 12, 1991

[54] FLUID-TIGHT CONNECTOR

[75] Inventor: Heinz U. Gähwiler, Domat, Switzerland

[73] Assignee: EMS-Inventa AG, Switzerland

[21] Appl. No.: 328,479

[22] Filed: Mar. 24, 1989

[30] Foreign Application Priority Data

Dec. 7, 1988 [DE] Fed. Rep. of Germany ....... 3841246

[51] Int. Cl.⁵ .............................................. F16L 35/00
[52] U.S. Cl. .................................... 285/331; 285/319;
 285/921; 285/39; 285/351; 285/423
[58] Field of Search ................. 285/921, 319, 331, 39,
 285/347, 351, 423

[56] References Cited

U.S. PATENT DOCUMENTS

| 3,997,195 | 12/1976 | Bartholomew | 285/331 X |
| 4,123,091 | 10/1978 | Cosentino et al. | 285/921 X |
| 4,225,162 | 9/1980 | Dola | 285/921 X |
| 4,484,769 | 11/1984 | Lacey | 285/331 X |
| 4,538,836 | 9/1985 | Krütten | 285/921 X |
| 4,673,200 | 6/1987 | Miyauchi | 285/921 X |
| 4,844,512 | 7/1989 | Gahwiler | 285/921 X |

Primary Examiner—Randolph A. Reese
Assistant Examiner—Carol I. Bordas
Attorney, Agent, or Firm—Jordan B. Bierman

[57] ABSTRACT

A connector including a male member and a female member adapted to mate therewith. The female member is hollow and has an annulus defining a plane substantially perpendicular to its axis. There is a substantially cylindrical hollow nozzle within the annulus and the nozzle has an outer diameter smaller than the inner diameter of the annulus, thus defining a space therebetween. A hollow portion extends away from the male member and is being substantially coaxial with the nozzle. The male member is generally cylindrical and hollow. It is provided with a collar having an outer diameter smaller than the inner diameter of the annulus and an inner diameter larger than the outer diameter of the nozzle, whereby the collar occupies the space. The male and female members, when connected, form a passage for flow of fluids therethrough.

89 Claims, 10 Drawing Sheets

FLUID-TIGHT CONNECTOR

This Application claims the priority of German Application No. 38 41 246, filed Dec. 7, 1988.

The present invention is directed to a connector for quick connection of tubular fluid conduits; more specifically, a connector comprising male and female members which are adapted to provide a seal therebetween.

BACKGROUND OF THE INVENTION

Devices of the type described herein are of particular value where compression and burst-resistant connections are required for tubular conduits such as pipes or hoses. In particular, they are well adapted for robotic assembly. While the present invention will be described with relation to flexible hoses such as those used in automobiles, it is not to be limited thereto and the person of ordinary skill will readily recognize numerous other applications.

While rubber has been used for hoses in automobiles for many years, there are certain drawbacks which have become apparent. Specifically, rubber is sensitive to gasoline and is easily deteriorated by contact therewith. Thus, it is of substantial advantage to be able to use plastic materials in place of rubber.

However, the connectors as presently used are of the compressive screw type, normally comprising a metal band which encircles the hose to be connected and a screw means for tightening to the desired degree. As will be readily appreciated, clamps of the foregoing type cannot be installed by robots, but rather must be individually attached manually. Moreover, such prior art connectors are screwed together and comprise a multiplicity of individual parts. These, of course, are easily dropped, lost, or mislaid.

Nonetheless, replacement of rubber by plastic presents certain difficulties. Such hoses cannot be adequately sealed by the use of the aforementioned clamps; therefore, it is a problem to provide a connector which is both burst-resistant and fluid-tight. In addition, it is desirable that the connector be such that simple translational motion is sufficient to make the connection. Such motion is readily carried out robotically, without the necessity of any human intervention.

THE PRIOR ART

The present invention is an improvement on the connector described in U.S. application Ser. No. 200,004, filed May 27, 1988 now U.S. Pat. No. 4,844,512. This Application sets forth locking male and female members which are rotatable with respect to each other while connected. A seal is provided at the interface between the two parts in order to avoid leakage. The female member includes a pair of diametrically opposed, inwardly extending detents and the male member is provided with an annular flange which is complementary to the detents so that, when it is inserted into the female member, the detent rides outwardly and over the flange and locks behind it. To disconnect, the female member is elastically deformed.

In U.S. Pat. Nos. 4,214,586 and 4,613,200, quick connectors having flanges engaged by complementary snap-fitting members are disclosed. However, connections of this character are unable to withstand pressure, so they are not suitable for use in connection with hoses carrying fluid under pressure, such as those found in automobiles.

U.S. Pat. No. 3,990,727 teaches a quick-release medical snap-fitting connector. The device has opposed detents at the open end of the female member. However, these are designed so that the force required for connection is the same as that required for disconnection. Thus, if this connector can be easily and readily mated, it can just as easily and readily be separated. Furthermore, such a connector will also tend to release under bending stress. Alternatively, if resistance to unwanted pressure separation is important, it must then be equally difficult to engage. These connectors, for the foregoing reasons, are not satisfactory for the purposes of the present invention.

SUMMARY OF THE PRESENT INVENTION

The present invention is intended to overcome the foregoing deficiencies of the prior art. In particular, it will provide a device easy and quick to engage, but which is extremely resistant to unwanted disconnection; thus, the connector of the present invention is fluid-tight and burst-resistant. Moreover, it is of simple construction, having few parts, and can be readily molded of plastic.

The connector of the present invention comprises a male member and a mating female member. The latter is substantially cylindrical in general shape and hollow along its axis. At the end nearer the male member (mating end), an annulus is provided, the plane of which is substantially perpendicular to the axis of the female member. A nozzle is located within the annulus and has an outer diameter which is smaller than the inner diameter of the annulus, forming a space therebetween.

At the end of the nozzle remote from the male member (attachment end), a portion extends away from the male member and is substantially coaxial with the nozzle. A bore extends through both the nozzle and the portion for flow of fluid.

The male member is also generally cylindrical and hollow. It comprises a collar at its end adjacent the female member (inner end) which has an outer diameter smaller than the inner diameter of the annulus and an inner diameter larger than the outer diameter of the nozzle. Therefore, the collar is adapted to fit into the space between the nozzle and the annulus and, when the connector is mated, a passage therethrough is provided.

For sealing purposes, it is preferred to have at least one circumferential groove in the nozzle with a sealing ring located therein. The ring is of such size that it bears against the inside surface of the male member and the nozzle. If desired, two or even more such grooves and sealing rings may be provided for those situations in which the tendency to leak is exceptional.

In a preferred form of the device, the annulus is supported by one or more struts which extend from the attachment end of the annulus away from the male member and terminate at a point at or adjacent the intersection of the nozzle and the portion. It has been found particularly desirable to have two such struts which are diametrically opposed to one another. It is also desirable that there be a disc perpendicular to the axis of the female member at the intersection of the nozzle and portion which acts as a support for the attachment end of the struts. Instead of the disc, the struts can comprise a first section which extends radially outwardly from the female part and a second section which extends longitudinally and parallel to the axis of the female part, terminating at the annulus.

The female member is provided with a detent which is adapted to engage a complementary flange on the male member. The detent advantageously comprises a ramp extending radially inwardly away from the male member and terminating in a stop, perpendicular to the axis of the nozzle, which faces away from the male member. The flange comprises a slope extending radially outwardly in the direction away from the female member and similarly terminates in a face, perpendicular to the axis of the male member, directed away from the female member. The detent and the flange are complementary to each other whereby, when the male member is inserted into the female member, the detent rides over the flange and snaps against the outside surface of the male member and the face on the flange bears against the stop on the detent. This prevents the connector from separating.

In a modification of the present invention, the annulus may be formed of an elliptical—rather than circular—cross-section. In such a case, the detents would be located most desirably at the ends of the minor axis of the ellipse. This embodiment has the advantage of tighter locking when the members are snapped together. Moreover, since the distance between the detents is smaller than in the device with the circular annulus, the leverage between them is reduced and there is a smaller moment resulting from tension on the connector and the detents.

In a further adaptation of the device wherein there are two grooves and two sealing rings, the ring nearer the male member and its groove have a smaller diameter than the groove and sealing ring more remote from the male member. The nozzle has a reduced diameter to correspond to the smaller ring and, of course, the inner surface of the male member is of a shape complementary thereto.

As a further modification of the present invention, the female member may be in two parts, a bushing and a central part. The bushing comprises the annulus and the struts, as well as a hollow cylinder extending from the base of the bushing toward the male member. The central part is the nozzle, the seal, and the portion. In this case, the wall of the cylinder on the bushing is adapted to bear against a hose which has been inserted over the nozzle, thereby fixing it more firmly to the connector.

It has also been found that, by undercutting the face of the flange and/or the stop of the detent, the interlocking connection can be improved. However, this may present some problems in molding.

Instead of providing grooves on the nozzle for sealing rings, both the nozzle and the collar may be stepped so that the sealing ring can be placed between these two elements. Since no groove is required, such parts are easier to mold and the connector can be shorter. Moreover, the sealing rings (and their grooves) may be dispensed with entirely and some flexible sealing material applied to the appropriate surface of the nozzle or male member. Press rings in conjunction with O-rings may also be used for sealing.

If a straight connection is not desired, the male and female members may be at an angle to one another. Also, it is possible to mold—or otherwise permanently connect—the portion and/or the male member to a hose or the like. It is to be preferred that the members be made from a flexible polymer, such as polyamide, polyacetal, or blends thereof. Of course, fillers, reinforcing materials, or other appropriate additives may be included.

In a particularly preferred form of the device, its release is accomplished by means of a tool having tines. The tines are inserted into the opening between the struts and the nozzle, preferably at a point adjacent the detents. The tines diverge toward the handle of the tool and, therefore, when it is inserted into the openings, the struts and annulus are caused to spread radially. The tool is inserted until deformation of the annulus and struts causes the stops on the detents to move beyond the face of the flange; the members can then be readily separated.

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
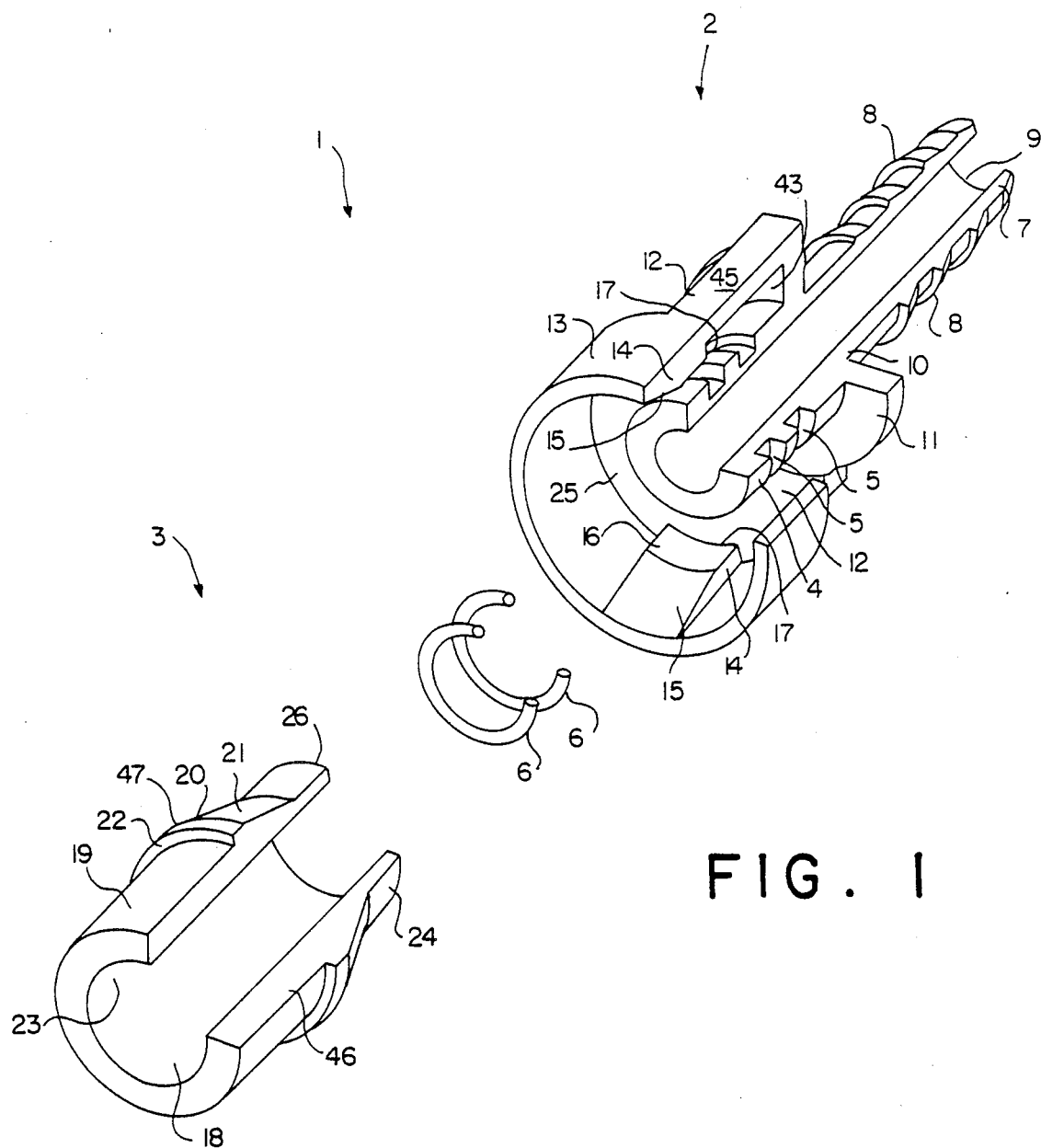
FIG. 1 is an exploded perspective view of the connector of the present invention.
Figure 2:
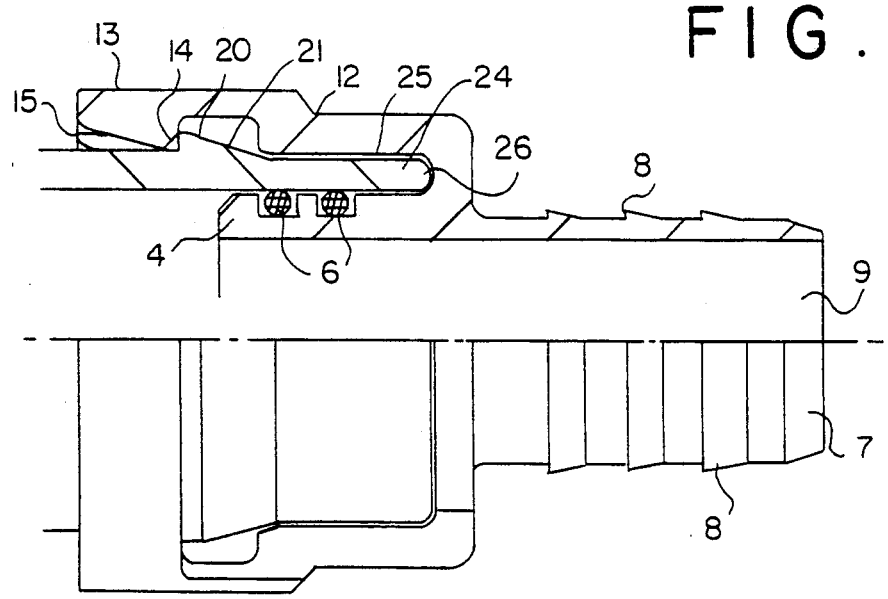
FIGS. 2 to 8 are partial schematic sectional views of various modifications of the present invention.
Figure 3:
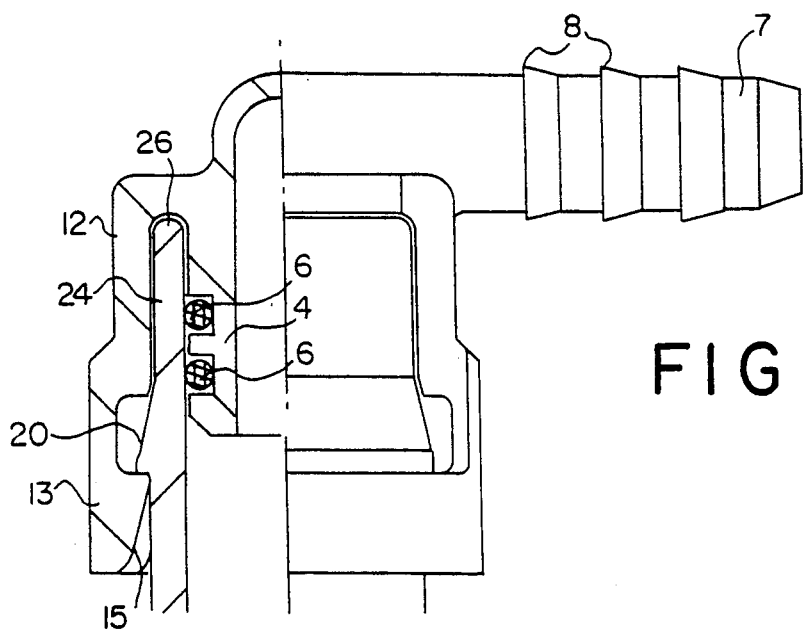
Figure 4:
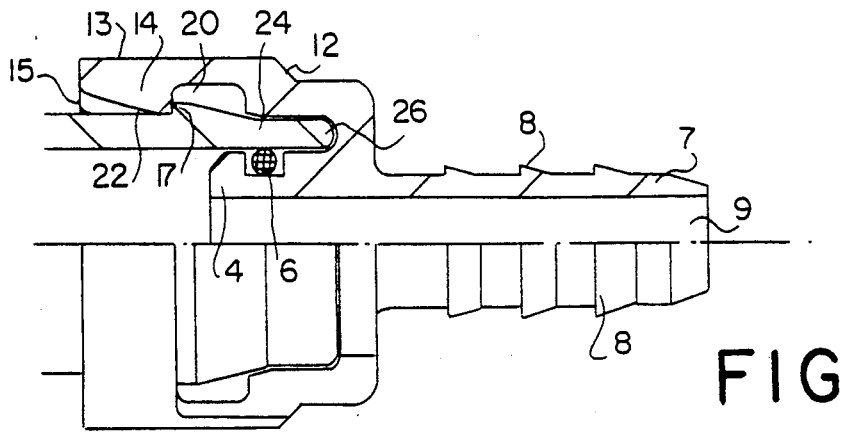

Referring particularly to FIGS. 1-4 and 6, connector 1 comprises female member 2 and male member 3. Female member 2 is provided with nozzle 4 having grooves 5 in which sealing rings 6 are located. At the opposite end of nozzle 4 and extending away from male member 3 is portion 7 which carries ridges 8 on its outer surface. Portion 7 is intended to receive a hose or similar conduit (not shown) and retain it thereon. In a preferred form of the device, the hose can be fused directly to portion 7. Bore 9 extends through portion 7 and nozzle 4. At connecting region 10, where portion 7 and nozzle 4 meet, there is provided disc 11 having its plane perpendicular to the axis of nozzle 4. Disc 11 carries struts 12 having second section 45 extending longitudinally of nozzle 4 and parallel to the axis thereof. The ends of struts 12 remote from disc 11 are joined to annulus 13. Annulus 13 is provided with detents 14 diametrically opposite to each other. Detents 14 comprise ramps 15, flats 16, and stops 17.

Male member 3 comprises cylindrical wall 46 carrying flange 20 on surface 19 intermediate the ends thereof. Projecting toward female member 2 is collar 24 having front end 26. Flange 20 comprises slope 21, area 47 and face 22. Inside surface 23 defines passage 18 for flow of fluid therethrough.

In assembling connector 1, male member 3 is inserted into female member 2. Collar 24 slides into space 25 between the exterior of nozzle 4 and the interior of annulus 13. Slopes 21 engage ramps 15 and force them outwardly as male member 3 is inserted into female member 2. When male member 3 is seated in female member 2, flange 20 has passed beyond the end of detents 14 and the latter snap inward radially so that stops 17 abut face 22 to lock the parts of connector 1 together. As will be readily understood, the construction of the connector is such that, as the tension thereon increases, its ability to hold is similarly increased, since the tension tends to cause annulus 13 to compress.

Figure 27:
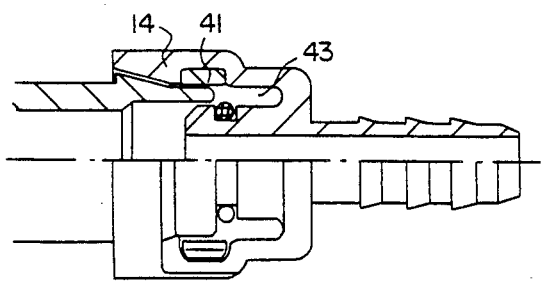
Figure 28:
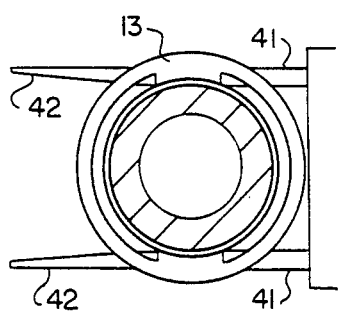

The release of connector 1 is shown in FIGS. 23 to 28. Release is accomplished through tool 40 having tines 41 and handle 50. Tines 41 are tapered in the direction away from the handle of the tools and towards their ends. They are inserted into opening 43 and, as they continue from the position shown in FIG. 24 to that shown in FIG. 26, detents 14 are forced radially outwardly so that stops 17 no longer abut face 22. Thereafter, as shown in FIGS. 27 and 28, the male member is withdrawn and annulus 13 assumes its original circular shape.

Figure 5:
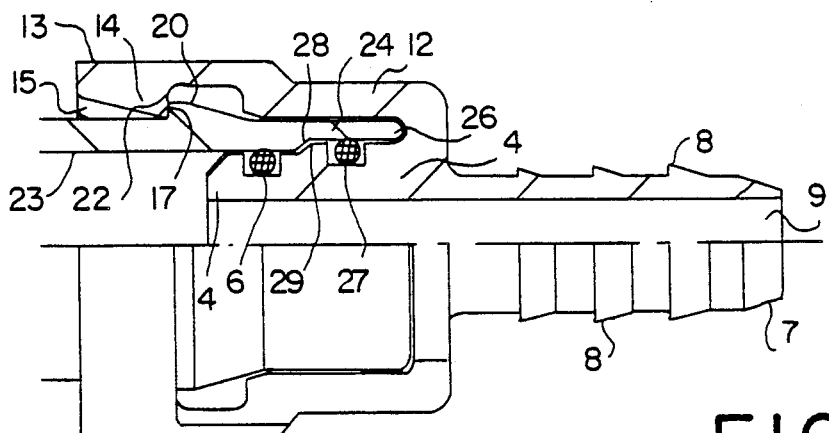
Figure 6:
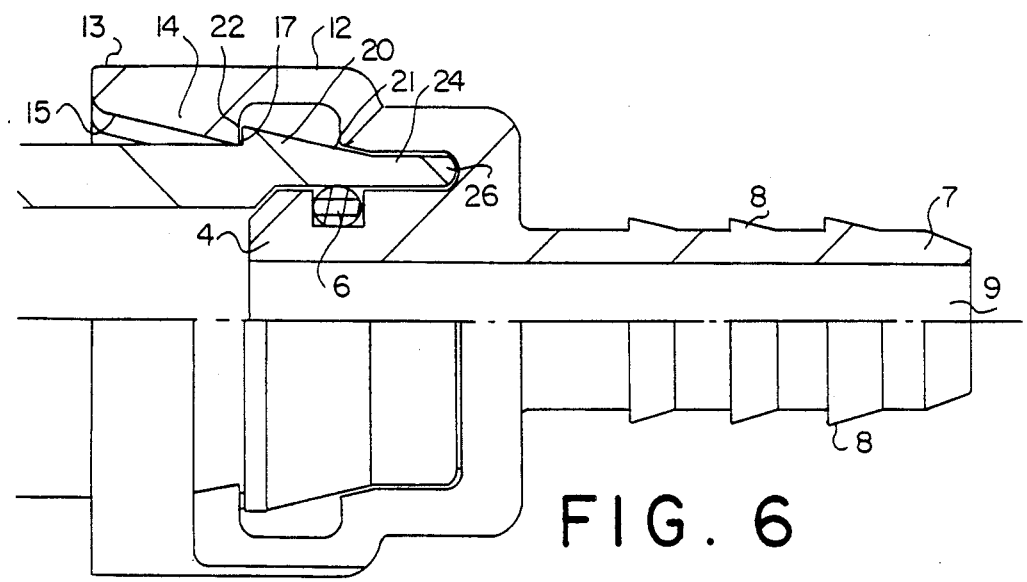

Referring to FIG. 5, a further embodiment of the invention is disclosed. It is similar to the forms as shown in FIGS. 1 to 4, except that sealing ring 5 and its corresponding groove are of substantially smaller diameter than sealing ring 27 and its corresponding groove. Inside surface 23 of collar 24 is provided with graduation 28 which is complementary to slant 29 on nozzle 4. Thus, when front end 26 of collar 24 is seated in the space between struts 12 and nozzle 4, graduation 28 abuts slant 29.

Figure 7:
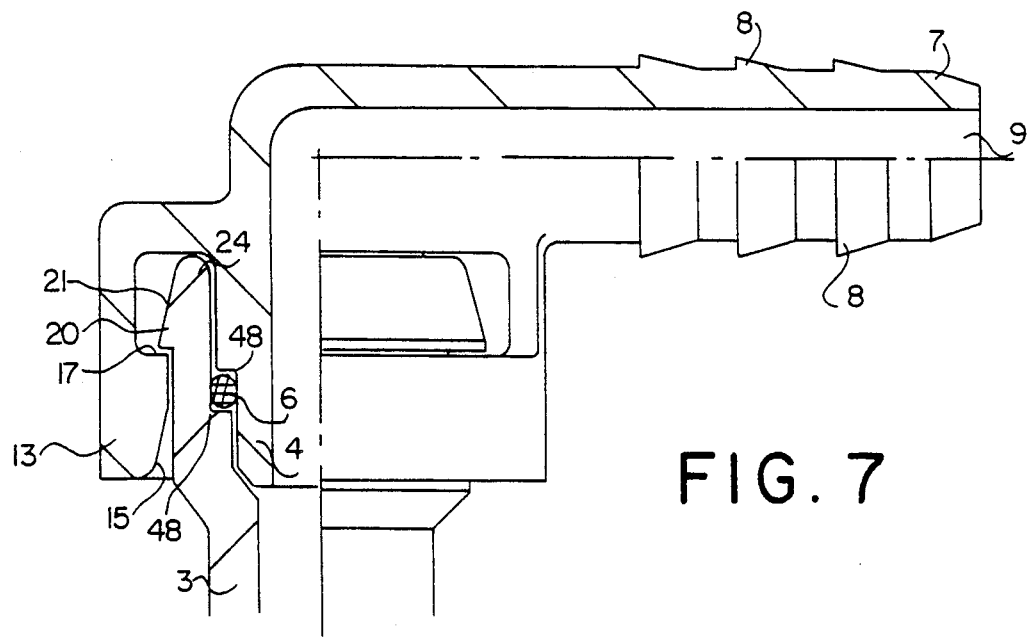

Referring now to FIG. 7, a still further modification of the present invention is shown. Male member 3 has no flange and, correspondingly, nozzle 4 has no detents. Instead, sealing ring 6 is held between notches 48, one of which is on inside surface 23 of collar 24 and the other on the external surface of nozzle 4. This form of the device, since it does not require the grooves of some of the other embodiments, is particularly simple and inexpensive to produce by injection molding.

Figure 8:
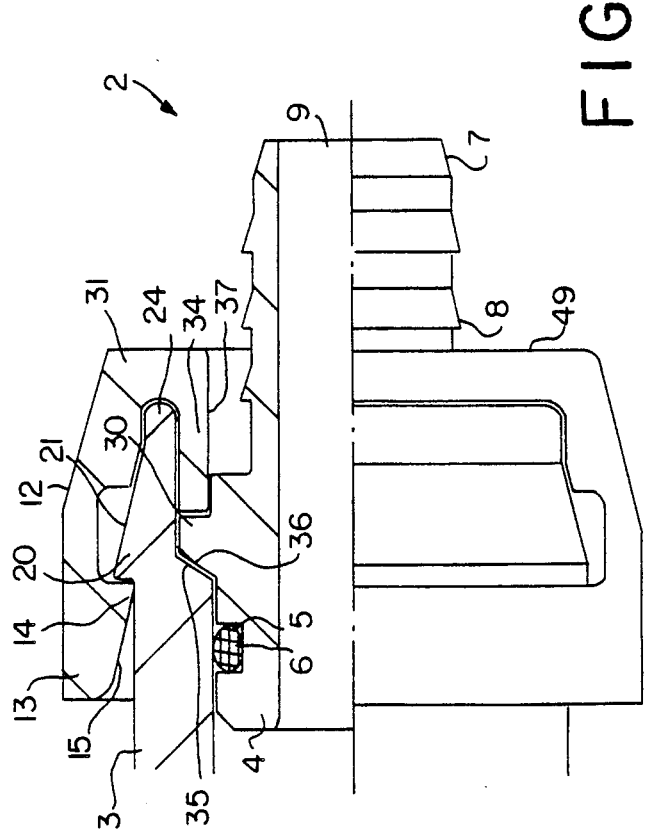
Figure 8A:
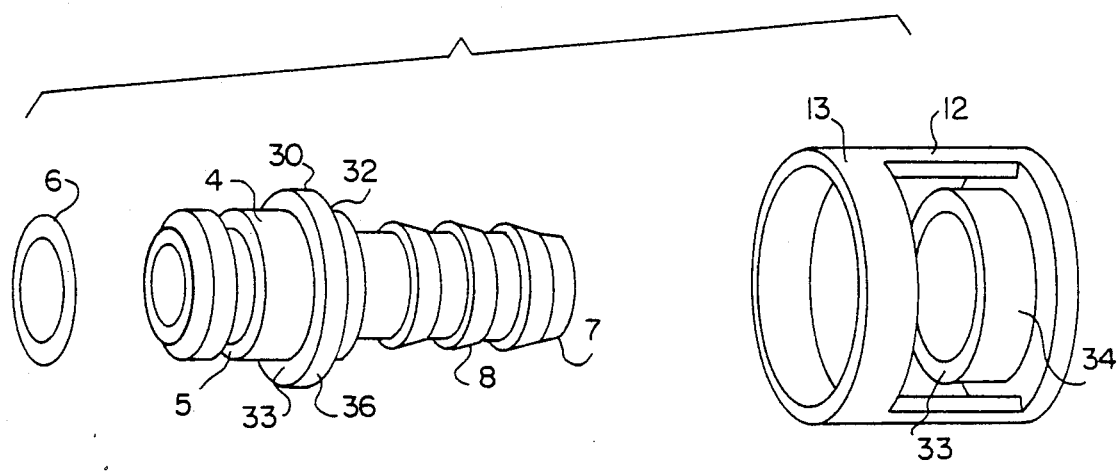
FIG. 8A is a perspective, exploded partial view of the connector of FIG. 8.

In FIGS. 8 and 8A, another form of the invention is shown. Female member 2 is in two parts, bushing 31 and nozzle 4. Bushing 31 comprises annulus 13 having detents 14 and struts 12. From base 49 of busing 31 extends cylinder 34 towards male member 3. Nozzle 4, carrying portion 7, is provided with element 30, which has slanted abutment 36, and which is complementary to step 35 of male member 3. Element 30 also has rearward bearing surface 32 which is in abutment with forward bearing surface 33 (see FIG. 8A). As can be seen from a comparison of FIGS. 8 and 8A, abutment 36 may be perpendicular to the axis of nozzle 4 or slanted with respect thereto.

Figure 10:
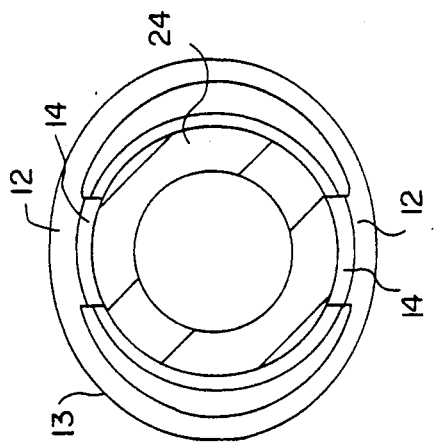
FIG. 10 is a sectional view of the connector of FIG. 9.
Figure 12:
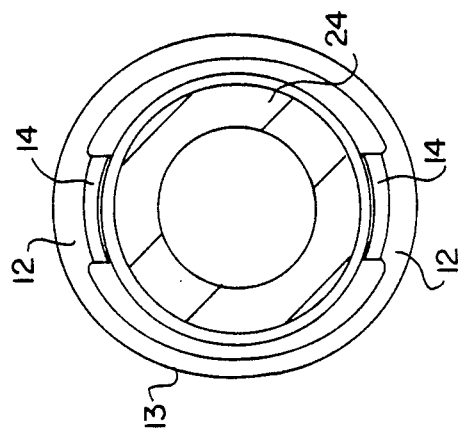
FIG. 12 is a cross-section of the device of FIG. 11.
Figure 9:
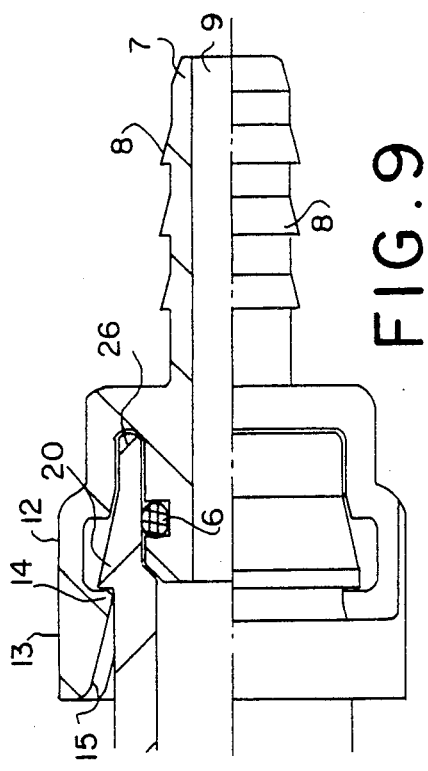
FIG. 9 is a view similar to that of FIG. 6 showing the parts of the connector fully engaged.
Figure 11:
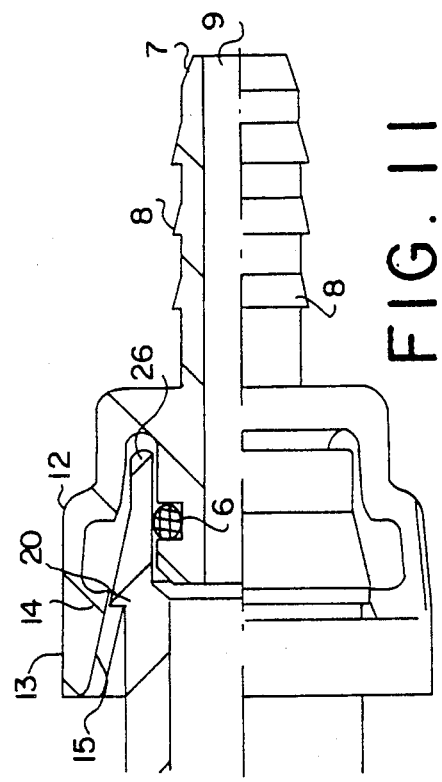
FIG. 11 is a view similar to that of FIG. 9 showing the connector only partially engaged.

A still further improvement of the present invention is shown in FIGS. 9 to 12. Annulus 13 is elliptical in cross-section and detents 14 are located at the ends of the minor axis thereof. When assembling this connector, insertion of male member 3 (as shown in FIGS. 11 and 12) distorts annulus 13 so that it assumes the approximately circular shape shown in FIG. 12. In this position, as can be seen in FIG. 11, detents 14 do not engage flange 20. However, as insertion is continued, the position as shown in FIGS. 9 and 10 is reached. Detents 14 bear against flange 20 to hold the connector together and annulus 13 assumes the elliptical shape shown in FIG. 10. Since annulus 13, in its relaxed state, maintains detents 12 close together, the pressure on collar 24 is increased and the security of the connector improved.

Figure 13:
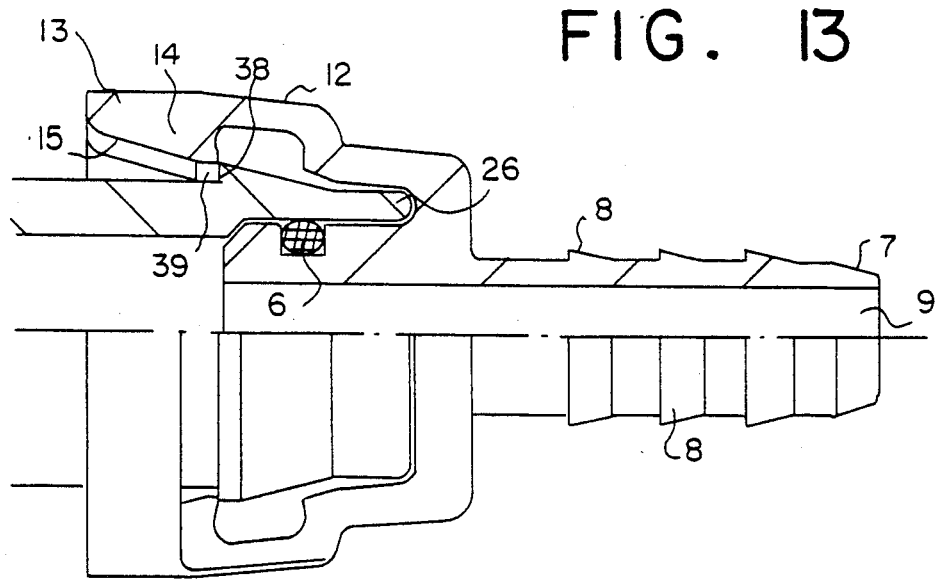
FIGS. 13 and 14 are views similar to those of FIGS. 2 to 8 showing the undercut face and stop of the present invention.
Figure 14:
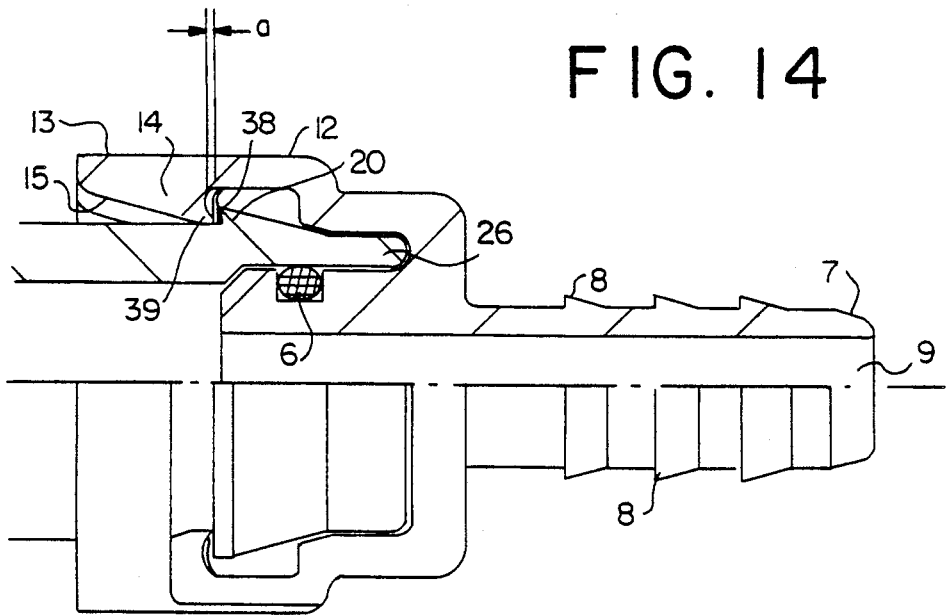

Referring now to FIGS. 13 and 14, there are provided undercut detents 38 and undercut flange 39. Because of the undercut, they grip each other as well as abutting and, therefore, provide a more secure locking means. The components are so proportioned as to leave clearance a (see FIG. 14) so that release is possible.

Figure 15:
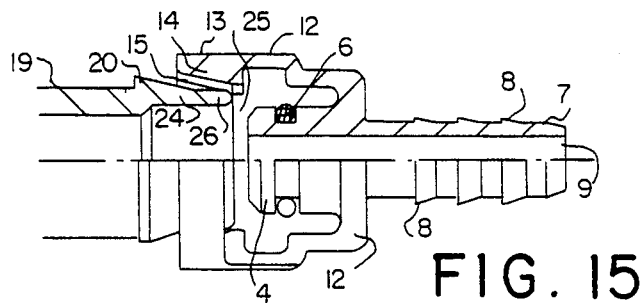
FIGS. 15, 17, 19 and 21 are views similar to those of FIGS. 2 to 8 showing the connector of the present invention in various stages of insertion.
Figure 16:
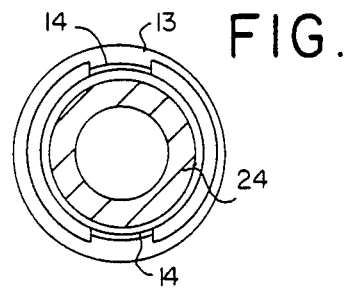
FIGS. 16, 18, 20 and 22 are cross-sectional views of FIGS. 15, 17, 19, and 21, respectively.
Figure 17:
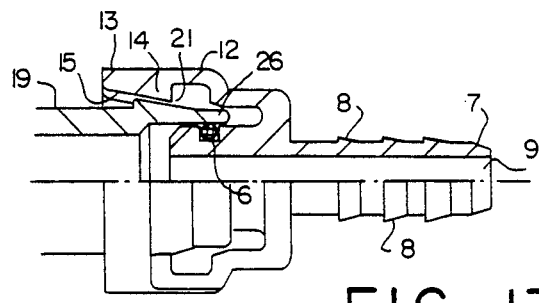
Figure 18:
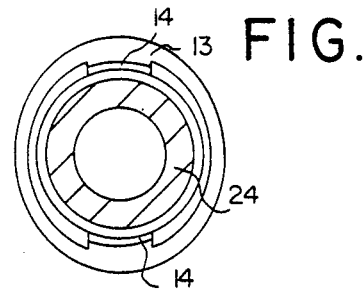
Figure 19:
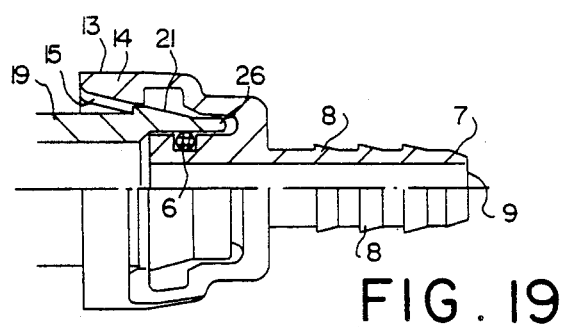
Figure 20:
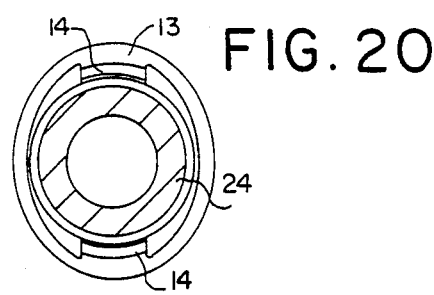
Figure 21:
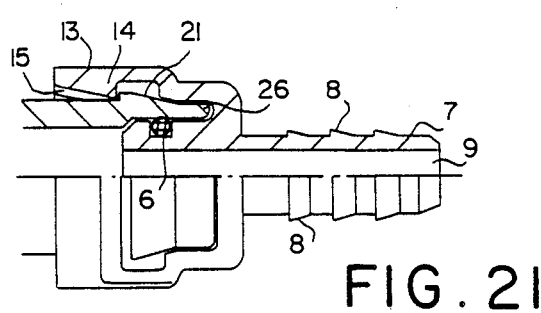
Figure 22:
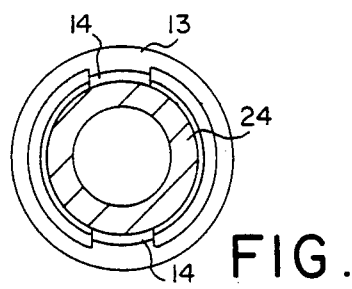
Figure 23:
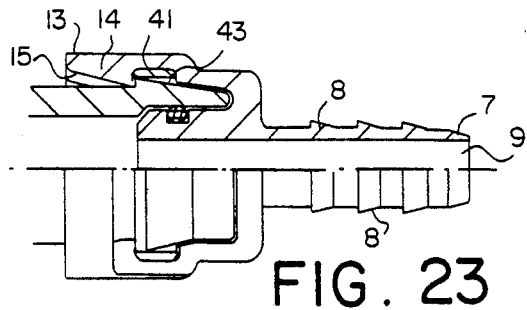
FIGS. 23, 25, and 27 are views similar to those of FIGS. 2 through 8 showing various stages of insertion of the releasing tool of the present invention.
Figure 24:
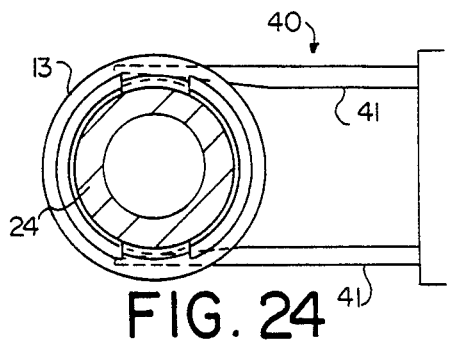
FIGS. 24, 26, and 28 are cross-sectional views of FIGS. 23, 25, and 27, respectively.
Figure 25:
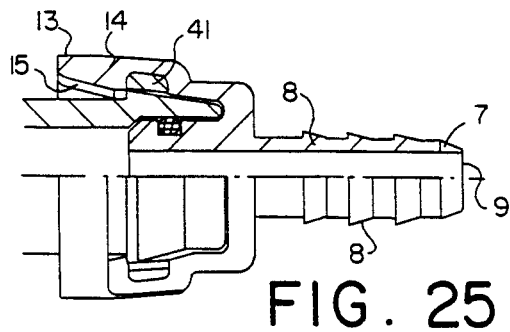
Figure 26:
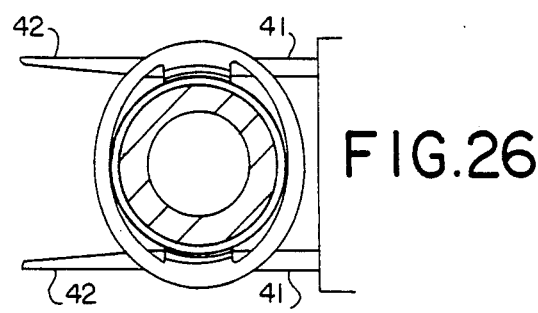

In FIGS. 15 to 22, the insertion of the male member into the female member is shown in four stages. Initially, as shown in FIG. 15, front end 26 of collar 24 begins entry into space 25. Annulus 13 exhibits its relaxed, substantially circular shape and is concentric with collar 24. Thereafter, as slope 21 meets ramps 15, annulus 13 begins to be distorted as detents 14 are forced apart. In FIGS. 19 and 20, annulus 13 has reached its maximum elliptical distortion and ramps 15 have almost cleared slope 21. The final position is reached when ramps 15 have gone beyond the edge of slope 21 as shown in FIG. 21. Annulus 13 then snaps inward, assuming the shape as shown in FIG. 22. The halves of the connector are now locked.

As can readily be understood from the foregoing, connectors of the present invention are freely rotatable, even though they are tightly sealed and locked. Moreover, locking can be effectuated merely by translational movement such as can easily be performed robotically. As tension is applied to the connector, its tendency is to grip more tightly so that it will not release absent actual tearing or breaking of the material of which it is made. In addition, when the connector has been separated, the sealing rings can easily be observed through the openings in the female member. Thus, it can readily be determined whether the sealing rings are worn and need replacement. Moreover, replacement of the rings is also simple.

While only a limited number of embodiments of the present invention have been expressly disclosed, it is, nonetheless, to be broadly construed and not to be limited except by the character of the claims appended hereto.

What we claim is:

1. A connector including a male member and a female member adapted to mate therewith, said female member being hollow and having a female axis therethrough, an annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle, said annulus being supported by at least one strut which extends from said annulus in said first direction and is affixed to said female part at a point adjacent an intersection of said nozzle and said portion, said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough,
said strut being connected at said intersection through a disc located in a plane substantially perpendicular to said female axis.

2. The connector of claim 1 comprising at least one circumferential groove in said nozzle and a sealing ring in said groove, said ring also contacting an inside surface of said male member whereby a seal is effected.

3. The connector of claim 2 wherein said sealing ring is a press ring.

4. The connector of claim 2 wherein there are two circumferential grooves in said nozzle and a sealing ring in each said groove.

5. The connector of claim 4 wherein the groove and sealing ring nearer said male member have a smaller diameter than the groove and sealing ring remote from said male member.

6. The connector of claim 1 wherein there are two said struts spaced substantially diametrically opposite each other.

7. The connector of claim 1 wherein said female member carries at least one detent and said male member comprises a flange, said flange and said detent being complementary to each other whereby, when said male member is inserted into said female member, a stop on said detent abuts a face on said flange to secure said male and female members together.

8. The connector of claim 7 wherein said detents comprise ramps extending in said first direction and radially inward to said stop and said flange comprises a slope extending in a second direction opposite to said first direction and radially outward to said face.

9. The connector of claim 7 wherein said annulus is elliptical and said detents are on a minor axis of said annulus.

10. The connector of claim 7 wherein a first section of said strut extends radially outwardly from said female part and substantially perpendicular to said female axis, and a second section of said strut extends parallel to said axis to said annulus, whereby said second section is spaced apart radially from said nozzle to form an opening.

11. The connector of claim 1 wherein said detent is on a radially inward surface of said female member and said flange is on a radially outward surface of said male member.

12. The connector of claim 1 wherein a first section of said strut extends radially outwardly from said female part and substantially perpendicular to said female axis, and a second section of said strut extends parallel to said axis to said annulus, whereby said second section is spaced apart radially from said nozzle to form an opening.

13. The connector of claim 1 wherein said annulus is elliptical.

14. The connector of claim 1 wherein said female member comprises a bushing and a central part,
said bushing comprising said annulus and said struts, and a cylinder extending in a second direction opposite to said first direction from a base of said bushing remote from said male member,
said central part comprising said nozzle and said portion.

15. The connector of claim 14 wherein said cylinder has an outer surface which is adapted to exert radially inward pressure on a conduit into which said portion projects.

16. The connector of claim 14 wherein said female member carries at least one detent on its radially inward surface, and said male member comprises a flange on its outer surface, said flange and said detent being complementary to each other whereby, when said male member is inserted into said female member, a stop on said detent abuts a face on said flange to secure said male and female members together.

17. The connector of claim 1 wherein said portion is at an angle to said nozzle.

18. The connector of claim 1 wherein said male member or said female member or both said male member and female member are at least partly composed of a flexible polymer.

19. The connector of claim 18 wherein said polymer is a polyamide, a polyacetal, or a blend thereof.

20. A connector including a male member and a female member adapted to mate therewith,
said female member being hollow and having a female axis therethrough, an annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle,
said annulus being supported by at least one strut which extends from said annulus in said first direction and is affixed to said female part at a point adjacent an intersection of said nozzle and said portion,
said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough,
said female member carrying at least one detent and said male member comprising a flange, said flange and said detent being complementary to each other whereby, when said male member is inserted into said female member, a stop on said detent abuts a face on said flange to secure said male and female members together,
said detents comprising ramps extending in said first direction and radially inward to said stop and said flange comprising a slope extending in a second direction opposite to said first direction and radially outward to said face.

21. The connector of claim 20 comprising at least one circumferential groove in said nozzle and a sealing ring in said groove, said ring also contacting an inside surface of said male member whereby a seal is effected.

22. The connector of claim 21 wherein said sealing ring is a press ring.

23. The connector of claim 21 wherein there are two circumferential grooves in said nozzle and a sealing ring in each said groove.

24. The connector of claim 23 wherein the groove and sealing ring nearer said male member have a smaller diameter than the groove and sealing ring remote from said male member.

25. The connector of claim 20 wherein there are two said struts spaced substantially diametrically opposite each other.

26. The connector of claim 20 wherein said detent is on a radially inward surface of said female member and said flange is on a radially outward surface of said male member.

27. The connector of claim 20 wherein a first section of said strut extends radially outwardly from said female part and substantially perpendicular to said female axis, and a second section of said strut extends parallel to said axis to said annulus, whereby said second section is spaced apart radially from said nozzle to form an opening.

28. The connector of claim 20 wherein said annulus is elliptical.

29. The connector of claim 20 wherein said annulus is elliptical and said detents are on a minor axis of said annulus.

30. The connector of claim 20 wherein said female member comprises a bushing and a central part,
said bushing comprising said annulus and said struts, and a cylinder extending in a second direction opposite to said first direction from a base of said bushing remote from said male member,
said central part comprising said nozzle and said portion.

31. The connector of claim 30 wherein said cylinder has an outer surface which is adapted to exert radially inward pressure on a conduit into which said portion projects.

32. The connector of claim 30 wherein said female member carries at least one detent on its radially inward surface, and said male member comprises a flange on its outer surface, said flange and said detent being complementary to each other whereby, when said male member is inserted into said female member, a stop on said detent abuts a face on said flange to secure said male and female members together.

33. The connector of claim 20 wherein said portion is at an angle to said nozzle.

34. The connector of claim 20 wherein said male member or said female member or both said male member and female member are at least partly composed of a flexible polymer.

35. The connector of claim 34 wherein said polymer is a polyamide, a polyacetal, or a blend thereof.

36. The connector of claim 20 wherein a first section of said strut extends radially outwardly from said female part and substantially perpendicular to said female axis, and a second section of said strut extends parallel to said axis to said annulus, whereby said second section is spaced apart radially from said nozzle to form an opening.

37. A connector including a male member and a female member adapted to mate therewith,
said female member being hollow and having a female axis therethrough, an elliptical annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle,
said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough.

38. The connector of claim 27 comprising at least one circumferential groove in said nozzle and a sealing ring in said groove, said ring also contacting an inside surface of said male member whereby a seal is effected.

39. The connector of claim 38 wherein said sealing ring is a press ring.

40. The connector of claim 38 wherein there are two circumferential grooves in said nozzle and a sealing ring in each said groove.

41. The connector of claim 40 wherein the groove and sealing ring nearer said male member have a smaller diameter than the groove and sealing ring remote from said male member.

42. The connector of claim 37 wherein said annulus is supported by at least one strut which extends from said annulus in said first direction and is affixed to said female part at a point adjacent an intersection of said nozzle and said portion.

43. The connector of claim 42 wherein there are two said struts spaced substantially diametrically opposite each other.

44. The connector of claim 42 wherein said female member carries at least one detent and said male member comprises a flange, said flange and said detent being complementary to each other whereby, when said male member is inserted into said female member, a stop on said detent abuts a face on said flange to secure said male and female members together.

45. The connector of claim 44 wherein said detents comprise ramps extending in said first direction and radially inward to said stop and said flange comprises a slope extending in a second direction opposite to said first direction and radially outward to said face.

46. The connector of claim 44 wherein said annulus is elliptical and said detents are on a minor axis of said annulus.

47. The connector of claim 44 wherein a first section of said strut extends radially outwardly from said female part and substantially perpendicular to said female axis, and a second section of said strut extends parallel to said axis to said annulus, whereby said second section is spaced apart radially from said nozzle to form an opening.

48. The connector of claim 42 wherein a first section of said strut extends radially outwardly from said female part and substantially perpendicular to said female axis, and a second section of said strut extends parallel to said axis to said annulus, whereby said second section is spaced apart radially from said nozzle to form an opening.

49. The connector of claim 37 wherein said female member comprises a bushing and a central part,
said bushing comprising said annulus and said struts, and a cylinder extending in a second direction opposite to said first direction from a base of said bushing remote from said male member,
said central part comprising said nozzle and said portion.

50. The connector of claim 49 wherein said cylinder has an outer surface which is adapted to exert radially inward pressure on a conduit into which said portion projects.

51. The connector of claim 49 wherein said female member carries at least one detent on its radially inward surface, and said male member comprises a flange on its outer surface, said flange and said detent being complementary to each other whereby, when said male member is inserted into said female member, a stop on said detent abuts a face on said flange to secure said male and female members together.

52. The connector of claim 37 wherein said portion is at an angle to said nozzle.

53. The connector of claim 37 wherein said male member and/or said female member is at least partly composed of a flexible polymer.

54. The connector of claim 53 wherein said polymer is a polyamide, a polyacetal, or a blend thereof.

55. A connector including a male member and a female member adapted to mate therewith,
- said female member being hollow and having a female axis therethrough, an annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle,
- said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough,
- at least one circumferential groove in said nozzle and a sealing ring in said groove, said ring also contacting an inside surface of said male member whereby a seal is effected,
- there being two circumferential grooves in said nozzle and a sealing ring in each said groove,
- the groove and sealing ring nearer said male member having a smaller diameter than the groove and sealing ring remote from said male member.

56. The connector of claim 55 wherein said annulus is supported by at least one strut which extends from said annulus in said first direction and is affixed to said female part at a point adjacent an intersection of said nozzle and said portion.

57. The connector of claim 56 wherein there are two said struts spaced substantially diametrically opposite each other.

58. The connector of claim 56 wherein said strut is connected at said intersection through a disc located in a plane substantially perpendicular to said female axis.

59. The connector of claim 56 wherein said female member carries at least one detent and said male member comprises a flange, said flange and said detent being complementary to each other whereby, when said male member is inserted into said female member, a stop on said detent abuts a face on said flange to secure said male and female members together.

60. The connector of claim 59 wherein said detent is on a radially inward surface of said female member and said flange is on a radially outward surface of said male member.

61. The connector of claim 59 wherein said detents comprise ramps extending in a first direction and radially inward to said stop and said flange comprises a slope extending in a second direction opposite to said first direction and radially outward to said face.

62. The connector of claim 59 wherein said annulus is elliptical and said detents are on a minor axis of said annulus.

63. The connector of claim 59 wherein a first section of said strut extends radially outwardly from said female part and substantially perpendicular to said female axis, and a second section of said strut extends parallel to said axis to said annulus, whereby said second section is spaced apart radially from said nozzle to form an opening.

64. The connector of claim 56 wherein a first section of said strut extends radially outwardly from said female part and substantially perpendicular to said female axis, and a second section of said strut extends parallel to said axis to said annulus, whereby said second section is spaced apart radially from said nozzle to form an opening.

65. The connector of claim 55 wherein said annulus is elliptical.

66. The connector of claim 55 wherein said sealing ring is a press ring.

67. The connector of claim 55 wherein said female member comprises a bushing and a central part,
- said bushing comprising said annulus and said struts, and a cylinder extending in a second direction opposite to said first direction from a base of said bushing remote from said male member,
- said central part comprising said nozzle and said portion.

68. The connector of claim 67 wherein said cylinder has an outer surface which is adapted to exert radially inward pressure on a conduit into which said portion projects.

69. The connector of claim 67 wherein said female member carries at least one detent on its radially inward surface, and said male member comprises a flange on its outer surface, said flange and said detent being complementary to each other whereby, when said male member is inserted into said female member, a stop on said detent abuts a face on said flange to secure said male and female members together.

70. The connector of claim 55 wherein said portion is at an angle to said nozzle.

71. The connector of claim 55 wherein said male member and/or said female member is at least partly composed of a flexible polymer.

72. The connector of claim 71 wherein said polymer is a polyamide, a polyacetal, or a blend thereof.

73. A connector including a male member and a female member adapted to mate therewith,
- said female member being hollow and having a female axis therethrough, an annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle, said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough, said female member comprising a bushing and a central part, said bushing comprising said annulus and said struts, and a cylinder extending in a second direction opposite to said first direction from a base of said bushing remote from said male member, said central part comprising said nozzle and said portion, said female member carrying at least one detent on its radially inward surface, and said male member comprising a flange on its outer surface, said flange and said detent being complementary to each other whereby, when said male member is inserted into said female member, a stop on said detent abuts a face on said flange to secure said male and female members together.

74. The connector of claim 73 comprising at least one circumferential groove in said nozzle and a sealing ring in said groove, said ring also contacting an inside surface of said male member whereby a seal is effected.

75. The connector of claim 74 wherein said sealing ring is a press ring.

76. The connector of claim 74 wherein there are two circumferential grooves in said nozzle and a sealing ring in each said groove.

77. The connector of claim 73 wherein said annulus is supported by at least one strut which extends from said annulus in said first direction and is affixed to said female part at a point adjacent an intersection of said nozzle and said portion.

78. The connector of claim 77 wherein there are two said struts spaced substantially diametrically opposite each other.

79. The connector of claim 77 wherein said female member carries at least one detent and said male member comprises a flange, said flange and said detent being complementary to each other whereby, when said male member is inserted into said female member, a stop on said detent abuts a face on said flange to secure said male and female members together.

80. The connector of claim 79 wherein said detent is on a radially inward surface of said female member and said flange is on a radially outward surface of said male member.

81. The connector of claim 79 wherein said annulus is elliptical and said detents are on a minor axis of said annulus.

82. The connector of claim 79 wherein a first section of said strut extends radially outwardly from said female part and substantially perpendicular to said female axis, and a second section of said strut extends parallel to said axis to said annulus, whereby said second section is spaced apart radially from said nozzle to form an opening.

83. The connector of claim 77 wherein a first section of said strut extends radially outwardly from said female part and substantially perpendicular to said female axis, and a second section of said strut extends parallel to said axis to said annulus, whereby said second section is spaced apart radially from said nozzle to form an opening.

84. The connector of claim 73 wherein said cylinder has an outer surface which is adapted to exert radially inward pressure on a conduit into which said portion projects.

85. The connector of claim 73 wherein said portion is at an angle to said nozzle.

86. The connector of claim 73 wherein said male member and/or said female member is at least partly composed of a flexible polymer.

87. The connector of claim 86 wherein said polymer is a polyamide, a polyacetal, or a blend thereof.

88. A method of releasing a connector including a male member and a female member adapted to mate therewith, said female member being hollow and having a female axis therethrough, an annulus defining a plane substantially perpendicular to said axis, a substantially cylindrical hollow nozzle within said annulus, said nozzle having an outer diameter smaller than an inner diameter of said annulus, thereby defining a space therebetween, a hollow portion extending in a first direction away from said male member and being substantially coaxial with said nozzle, said annulus being supported by at least one strut which extends from said annulus in said first direction and is affixed to said female part at a point adjacent an intersection of said nozzle and said portion, said male member being generally cylindrical and hollow with a male axis therethrough and comprising a collar of outer diameter smaller than said inner diameter of said annulus and an inner diameter larger than said outer diameter of said nozzle, whereby said collar is adapted to occupy said space, said male member and said female member, when connected, forming a passage for flow of fluids therethrough, said female member carrying at least one detent and said male member comprising a flange, said flange and said detent being complementary to each other whereby, when said male member is inserted into said female member, a stop on said detent abuts a face on said flange to secure said male and female members together, a first section of said strut extending radially outwardly from said female part and substantially perpendicular to said female axis, and a second section of said strut extending parallel to said axis, whereby said second section is spaced apart radially from said nozzle to form an opening, said method comprising inserting a spreader into said opening, moving said detent radially outwardly so that said stop no longer abuts said face, thereby permitting said male member and said female member to be separated.

89. The method of claim 88 wherein there are two said struts, each carrying one said detent, substantially diametrically opposed to each other and forming two said openings, inserting said spreader into said openings and moving said detents radially outwardly so that said stops no longer contact said faces, thereby permitting said male member and said female member to be separated.

* * * * *